June 24, 1924.　　　　　　1,498,625
B. R. HABERKORN
AUTO SIGNAL
Filed April 18, 1918　　2 Sheets-Sheet 1

Inventor:
Bendix R. Haberkorn,
by: Howard Fischer,
Attorney.

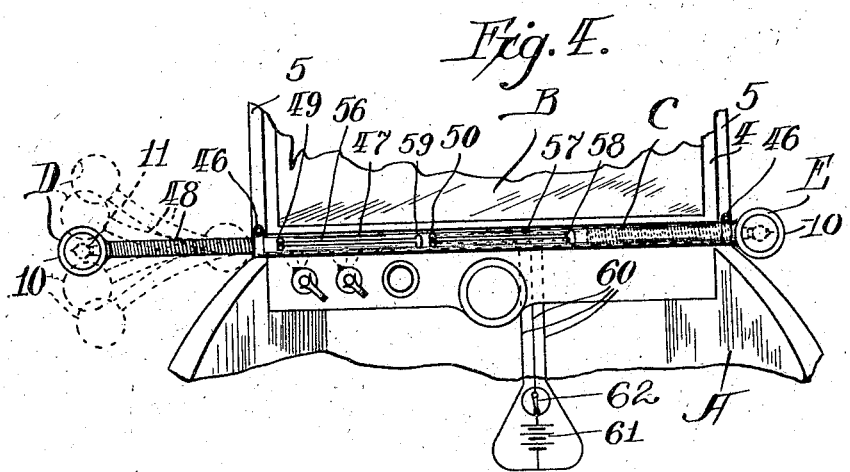

Patented June 24, 1924.

1,498,625

UNITED STATES PATENT OFFICE.

BENDIX R. HABERKORN, OF ST. PAUL, MINNESOTA.

AUTO SIGNAL.

Application filed April 18, 1918. Serial No. 229,394.

*To all whom it may concern:*

Be it known that I, BENDIX R. HABERKORN, a citizen of the United States, residing at St. Paul, in the county of Ramsey and State of Minnesota, have invented a new and useful Improvement in Auto Signals, of which the following is a specification.

My invention relates to signals and is particularly adapted to a signal for automobiles where it is desired at frequent intervals to signal to the public the direction in which the automobilist wishes to travel with his automobile.

The primary object of my device is in a signal which is of simple construction and which will readily attract attention, when in signaling position by self-contained means which causes it to wave and thus be very attractive to the eye.

A further object is in a device which when attached to the wind-shield of an automobile is practically unnoticeable for the reason that it can be secured to the top or bottom of the same along the frame which holds the wind-shield glass.

It is also an object to provide a signaling device which can be made a part of the windshield frame or be contained in the frame of the windshield so that the parts of the signal are practically enclosed within the wind-shield frame.

These features together with other details of construction will be more clearly set forth in the following specification and claims.

In the drawing forming part of the specification,

Figure 4 illustrates a detail portion of an automobile illustrating an alternative construction of my device, attached thereto.

Figure 5 illustrates a detail portion of the signal of the construction illustrated in Figure 4.

Figure 6 is a cross section on the line 6—6 of Figure 5.

Figure 7 is a detail of a portion of the signal device.

Figure 8 illustrates a cross section of an alternative construction of the signal device.

Figure 9 is a cross section on the line 9—9 of Figure 2.

Figure 1:
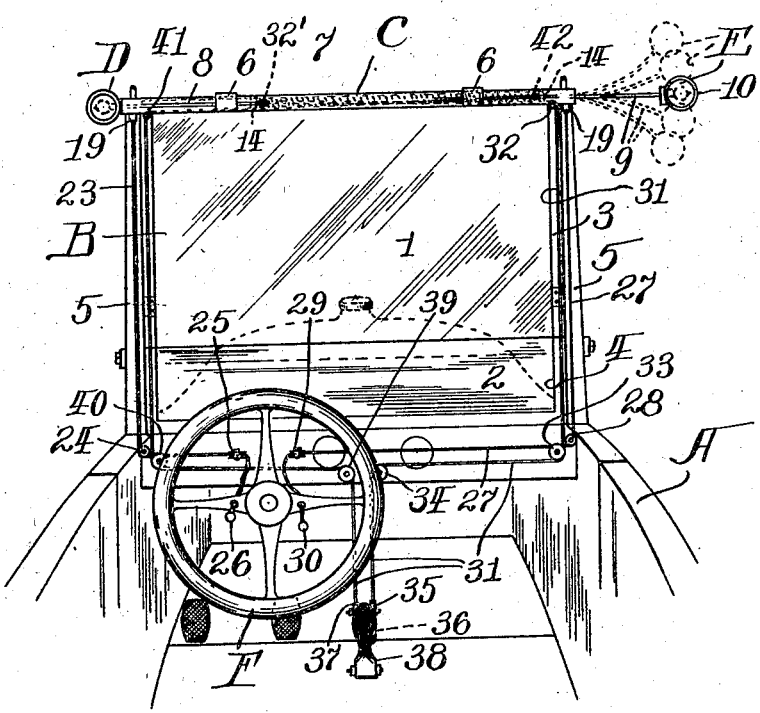
Figure 1 is a perspective view of a portion of an automobile, diagrammatically illustrating my device attached thereto.

In the drawing, A represents an automobile, only a portion of which is illustrated, having a wind-shield B of ordinary construction with an upper glass portion 1 and lower portion 2. The wind-shield glasses 1 and 2 are adapted to be held in the ordinary manner in the frame members 3 and 4 respectively, and are pivotally held to the uprights or braces 5 in the ordinary manner.

The signal C is rigidly secured to the upper edge of the frame work 3 by means of the bracket 6 and is adapted to extend approximately from one to the other of the uprights 5, being out of the way of the top when the same is held by the uprights and in a position to readily be seen when the signal is in operation.

The signal C is formed with a hollow tubular body portion 7 which is approximately circular in cross section and which extends from one upright to the other. The body portion 7 is formed with longitudinally extending grooves 8 in which the thin flexible arm 9 of the signal is adapted to freely slide.

The arm 9 has a canteen shaped bulb or head portion 10 rigidly secured to its outer end in which is positioned a signal light 11. The canteen-shaped head or bulb portion is formed with openings on either side in which disk-shaped glasses 12 are positioned and firmly held by the springs 13 and which are of any suitable color and through which the light can shine from the electrical bulb 11.

The inner end of the arm 9 has a disk or cylindrical portion 14 rigidly secured thereto which is adapted to engage against a stop 15 fixed in the housing 7, near the outer end thereof, when the arm 9 is slid outwardly in operation. The outer end 16 of the casing or body portion 7 of the signal has a disk portion 17 rigidly fixed therein and is formed with an opening or slot 18 through which the arm 9 is adapted to freely slide. The disk 17 forms a closure for the end of the housing 7 and also a support for the arm 9 when it is in or out of signaling position and assists in holding the arm 9 against twisting in the body portion 7. The grooves 8 also tend to hold the arm 9 against twisting in the housing.

Figure 2:
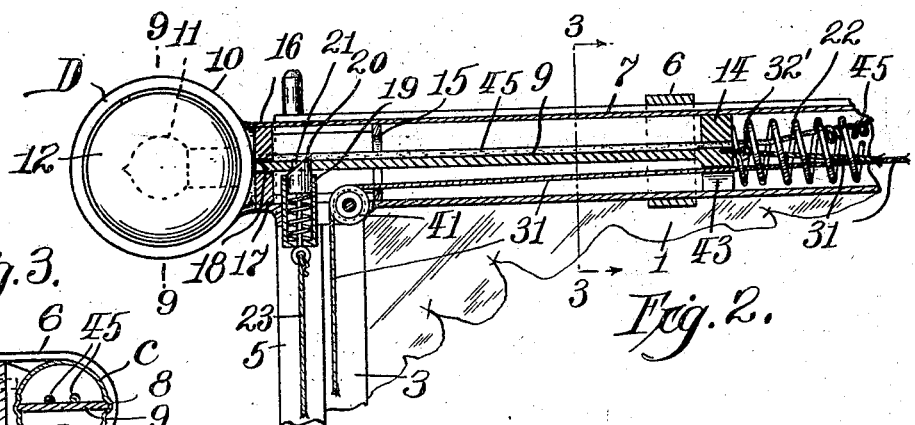
Figure 2 is a longitudinal cross section of a detail portion of the signal device.
Figure 3:
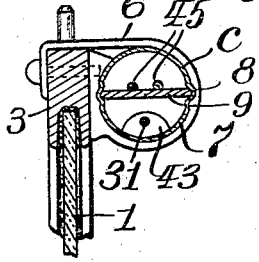
Figure 3 is a cross section on the line 3—3 of Figure 2.

When the arm 9 is drawn into the housing 7 out of signaling position as illustrated in Figure 2, it draws the signal head 10 out of signaling position. A spring catch 19 is positioned in the housing 7 and is formed with an engaging tongue 20 which is adapted to engage the arm 9 in the opening 21 formed in the arm to hold or lock the arm out of signaling position in the housing.

The signal C is provided with two signal arms 9 which are slidably positioned in either end of the same and which are of the same general dimensions and construction, each carrying a signal head 10 to form two separate signals D and E. The signal D is used to indicate the direction of travel of the auto in one direction, say to the left, and the signal E to indicate the travel of the automobile in the opposite direction. The signal C is provided with two spring catches 19 which are positioned near either end of the same, one being used to release the signal D and the other to release the signal E. Both of the signals D and E are similar in construction and a coil spring 22, which is positioned centrally in the housing 7 between the ends 14 of the signals D and E, is adapted to automatically force the signals into signaling position when either of the spring catches 19 are released or disengaged from the arm 9.

The spring catch 19, which holds the signal D out of signaling position, is operated by the pull cord 23 which passes over the pulleys 24 and 25 and extends up the steering post of the auto to the steering wheel F and through one of the arms of the steering wheel having an engaging end 26 formed on its end so that the cord 23 can be easily operated by pulling on the end 26. The spring catch 19, controlling the signal E, is operated by the pull-cord 27 which passes over the pulleys 28 and 29 and has an engaging end 30 which is positioned on the steering wheel F. Figure 1 illustrates the signal E in signaling position. The coil spring 22 is adapted to force either of the signals D or E into operating position when their holding catches 19 are released and is compressed when the signals D and E are drawn in out of signaling position.

A cord 31 is connected at 32 to the end 14 of the signal arm 9 and extends over the pulleys 32, 33, 34, and the pulleys 35, 36 and 37 which are attached to the foot pedal 38, and from the foot pedal the cord 31 passes up over the pulleys 39, 40 and 41, having its end connected at 42 to the portion 14 of the arm 9 of the signal E. Thus when either of the signals D or E are released into signaling position the cord 31 will be pulled outward by the arm 9 and will raise the foot pedal 38 as illustrated in dotted outline in Figure 7. The cord 31 extends through the housing 7 over the pulleys 32 and 41 and through the opening 43 formed in each of the members 14, and thence through the coils of the spring 22 so as to connect at 32 and 42 to the members 14.

Figure 1 illustrates the signal E in signaling position as it would appear from inside of the automobile A after the cord 27 has been pulled by engaging the end 30 of the same to release the catch 19 of the signal E, the spring 22 automatically forcing the signal E into signaling position. The arm 9 is formed of resilient material and is sufficiently flexible to cause the head 10 of the signal E to wave up and down of itself as illustrated in dotted outline by the vibration or jar of the auto when the signal E is in signaling position. In this manner when either of the signals E or D are extended into signaling position they will wave up and down by the slightest vibration and thus easily attract the eye of the public. This construction of the flexible arm 9 gives a practical signal without expensive construction, complicated mechanism or the use of other energy to cause the arm to vibrate or wave. It is obvious that the waving signal is more attractive to the eye than the stationary or ordinary signal arm. The flexibility of the arm 9 can be of any desired degree to give the amount of vibration or waving of the signal that may be most desirable.

When it is desired to withdraw either of the signals D or E out of signaling position in the construction illustrated in Figure 1 it is only necessary to press the foot pedal 38 downward from the elevated position, pulling on the cord 31 and drawing the signal D in out of signaling position so that the spring catch 19 will engage in the opening 21 formed in the arm 9. The foot pedal 38 is elevated as is illustrated in Figure 7 when either of the signals D or E are released into signaling position, as the pull-cord 30 is made short enough to move the pedal 38 when either of the signals are released.

In the use of the signal C, with its signals D and E, it is very easy for the automobilist to release either of the signals by engaging the ends 25 or 30 and giving a slight pull on the same, thus releasing the desired signal into signaling position and as long as the signal is in signaling position it will continue to wave up and down freely by itself, or by the vibration of the automobile on which the signal is carried. The automobilist can then withdraw the signal from signaling position by depressing the foot pedal 38. In this manner his attention is not detracted from his steering wheel or the operation of his automobile mechanism and the public is notified in a very attractive manner the direction in which the automobilist intends to travel with his auto. The cords 23 and 27 have sufficient slackness from the pulleys 25 and 29 up the steering post to the steering wheel so that the steering wheel F can be rotated without releasing or pulling the cords 23 and 27 and accidentally releasing either of the catches 19.

Each of the signals D and E are equipped with an electric light 11 which is fixed in the heads 10 between the glasses 12 and which are connected by means of the wires 45 to an electric battery or any other suitable source of electric energy, only a portion of the wires 45 being illustrated and the source of electrical energy or the connecting parts not being illustrated in the drawing. The wires 45 are of sufficient length to allow the arm 9 to be slid out into signaling position and are adapted to be enclosed in the housing 7 when the signal is withdrawn from signaling position. It is obvious that the electrical connections to the light 11 can be of any well known construction and it is only necessary to use or have the electric lamp 11 lit at night time or when the signal is in signaling position. The use of the electric lamps 11 at night in the signals D and E are very effective and give a practical signal device, due to the fact that they are in continual motion or waving when in signaling position. The electrical connections can be of such that the lamp 11 goes out when the signal is withdrawn from signaling position, this being of ordinary construction.

The construction illustrated in Figure 4 illustrates the signal C attached to the lower portion of the wind-shield B by means of the clamps 46 or any other suitable means and in this position the signals D and E are considerably lower than in the construction illustrated in Figure 1. In this construction the housing 47 is tubular in shape and extends between each of the uprights or wind-shield braces 5 the full width of the wind-shield.

In this construction the signals D and E are connected to a coil spring arm 48 which is made up of coils of spring wire of suitable resiliency so that when either of the signals are in signaling position they will wave up and down freely in the same manner as in the construction illustrated in Figure 1. The coil spring arms 48 are adapted to be enclosed in the housing 47 when the signals D or E are out of signaling position. Operating levers 49 and 50 are rigidly secured to the inner ends of the arms 48 and the levers or handles 49 and 50 are adapted to hold the signals locked in or out of signaling position. The handles 49 and 50 are identical in constructon and are formed with arms 51 and 52 which are pivotally held by means of the bolt 53 to a portion 54 which is rigidly secured to the inner end of the coil spring arm 48. A coil spring 55 is interposed between the outer ends of the arms 51 and 52 so as to hold the arms normally in spread apart position. The handles 49 and 50 are adapted to slide in the slots 56 and 57 which are formed in the housing 47 and the slots 56 and 57 are formed with enlarged portions or notches 58 on their outer end and notched portions 59 on their inner end. The notched portions 59 on the inner ends of the slots 56 and 57 are adapted to engage the arms 51 and 52 of the handles 49 and 50 to hold the signals D and E locked out of signaling position and when it is desired to slide one of the signals into signaling position either the handle 49 or 50 is engaged and compressed, unlocking it from the notch 59; whereupon it can be slid along in the slot 56 or 57 until the arms of the handle engage in the outer notch 58, the notch 58 holding the signal locked in signaling position. Figure 4 illustrates the signal D in signaling position with its controlling handle 49 locked in the notch 58 of the slot 56. The positions the signals D and E assume when vibrating and when they are in signaling position are illustrated in dotted outline in Figure 4. In this construction the operator can easily engage either of the handles 49 or 50 and slide the signals D or E respectively, in or out of signaling position and the flexible coil spring arm 48 will cause the signals to vibrate or wave sufficiently to attract the desired attention.

This construction is very simple and inexpensive and the signals are equipped with an electric light 11 connected by means of the wires 60 to the battery 61 and the switch 62. The wires 60, switch 62 and battery 61 are illustrated diagrammatically in Figure 4. It is also obvious in this construction, that the electric light 11 can be connected in any suitable manner. The heads 10 of the signals D and E in this construction are also canteen-shaped with the concave, disk-shaped glass sides 12, as are illustrated in Figure 9. The handles 49 and 50 tend to hold the signals D and E from twisting in the housing 47. The housing 47 can also be formed with a groove 63 which extends longitudinally along the inner side of the same and which engages in the member or end 54 which is secured rigidly to the coil spring arm 48.

In the construction illustrated in the cross section in Figure 8 the tubular housing 65 which encloses the flexible signal arm 66, forms a part of the frame of the wind-shield 67 and in this construction the signal is built directly into and is a part of the wind-shield frame, thus concealing the same and giving a very neat and simple construction. The flexible signal arm 66 is operated or slid back and forth into and out of signaling position by means of the handle 68 which slides in a slot 69 and the handle 68 is equipped with a spring catch 70 which engages in notches formed in either end of the slot 69, in a similar manner as the handles 49 and 50 engage in the slots 56 and 57 and in the notches 58 and 59. Thus by means of a simple construction the signal device can be made a part of the wind-shield frame, giving a concealed signal device on the automobile which does not give an undesirable appearance to the same and at the same time giving a very effective and easily operated signal.

The flexible arm causes the signal to vibrate or wave freely and easily of itself when in signaling position without the use of energy from any other source and the vibration of the automobile as it travels along over the road will add to the vibration sufficiently to increase the waving of the signal and in this manner readily attract the attention of the public, a feature which is very desirable in an automobile signal.

In accordance with the patent statutes, I have described the principles of operation of my invention together with the apparatus which I now consider to represent the best embodiment thereof; but I desire to have it understood that the construction is only illustrative and that the invention can be carried out by other means and applied to uses other than those above set forth within the scope of the following claims:

1. An automobile signal including a tubular support, outwardly extending oppositely facing grooves formed in said tubular member and a signal member slidable in said grooves and means for ejecting or drawing inwardly the same into said tubular member.

2. The combination with the windshield of an automobile having glass panels, of a metallic frame for said panels extending therearound, a signalling arm located within a transverse portion of said frame, a signal carried by said arm, means for retaining said signal in an inoperative position, and means for ejecting said signal to an extended position upon the release of said retaining means.

BENDIX R. HABERKORN.